United States Patent
Sharma et al.

(10) Patent No.: US 10,489,440 B2
(45) Date of Patent: Nov. 26, 2019

(54) SYSTEM AND METHOD OF DATA CLEANSING FOR IMPROVED DATA CLASSIFICATION

(71) Applicant: Wipro Limited, Bangalore (IN)

(72) Inventors: Mohit Sharma, Bangalore (IN); Srinivas Adyapak, Bangalore (IN)

(73) Assignee: Wipro Limited, Bangalore (IN)

(*) Notice: Subject to any disclaimer, the term of this patent is extended or adjusted under 35 U.S.C. 154(b) by 260 days.

(21) Appl. No.: 15/461,919

(22) Filed: Mar. 17, 2017

(65) Prior Publication Data

US 2018/0218070 A1  Aug. 2, 2018

(30) Foreign Application Priority Data

Feb. 1, 2017  (IN) .............................. 201741003801

(51) Int. Cl.
*G06F 16/33* (2019.01)
*G06F 16/35* (2019.01)
*G06F 16/215* (2019.01)

(52) U.S. Cl.
CPC .......... *G06F 16/353* (2019.01); *G06F 16/215* (2019.01); *G06F 16/334* (2019.01)

(58) Field of Classification Search
CPC ..... G06F 16/215; G06F 16/334; G06F 16/353
USPC ....................................................... 707/692
See application file for complete search history.

(56) References Cited

U.S. PATENT DOCUMENTS

| 7,043,476 | B2 | 5/2006 | Robson |
| 8,140,567 | B2 | 3/2012 | Padovitz et al. |
| 8,751,218 | B2 | 6/2014 | Dang et al. |
| 2008/0189316 | A1* | 8/2008 | Otsuka ................ G06F 16/3335 |
| 2014/0297659 | A1* | 10/2014 | Larsson ............ G06F 16/24578 707/750 |

* cited by examiner

*Primary Examiner* — James Trujillo
*Assistant Examiner* — Jessica N Le
(74) *Attorney, Agent, or Firm* — Finnegan, Henderson, Farabow, Garrett & Dunner, LLP (57) ABSTRACT

A system and method for data cleansing are disclosed. The method includes receiving by a data classifier, a data corpus comprising one or more words. The method further includes grouping the one or more words into a plurality of pre-defined categories and determining an overlap ratio between each pair of the plurality of pre-defined categories based on a comparison between each of the plurality of pre-defined categories. A normalized overlap ratio is computed for each of the plurality of pre-defined categories based on a combination of each overlap ratio. At least one of the plurality of pre-defined categories is determined based on a comparison between each of the normalized overlap ratio and an ideal overlap ratio. Finally, one or more common words from the selected at least one of the plurality of pre-defined categories is removed based on a frequency of occurrence of the one or more common words.

15 Claims, 3 Drawing Sheets

SYSTEM AND METHOD OF DATA CLEANSING FOR IMPROVED DATA CLASSIFICATION

TECHNICAL FIELD

This disclosure relates to natural language processing, and more particularly to a system and method of data cleansing for improved data classification.

BACKGROUND

Data cleansing is an important step in data mining, text analysis and performing data classification. This is the process of removing noisy, incorrect, improperly formatted and garbage data to achieve higher accuracy in categorizing data. However, determining whether a word or concept belongs to noise or if it is important is a very difficult process due to its scale.

A data classifier system may wrongly classify several problem statements, due to common words which may occur across various categories. For example, if the word crash appears in a problem statement for classification, the system may not be able to classify it properly, since crash may mean anything from share market crash, software crash or aeroplane crash. Hence various categories may have similar words, and hence making data classification less precise for the systems.

Conventional approaches for data classification, may not be accurate as they are not able to detect such words common between different categories.

SUMMARY

In one embodiment, a method for data cleansing is described. The method includes receiving by a data classifier, a data corpus comprising one or more words. The method further includes grouping the one or more words into a plurality of pre-defined categories and determining an overlap ratio between each pair of the plurality of pre-defined categories based on a comparison between each of the plurality of pre-defined categories. A normalized overlap ratio is computed for each of the plurality of pre-defined categories based on a combination of each overlap ratio. At least one of the plurality of pre-defined categories is determined based on a comparison between each of the normalized overlap ratio and an ideal overlap ratio. Finally, one or more common words from the selected at least one of the plurality of pre-defined categories is removed based on a frequency of occurrence of the one or more common words.

In another embodiment, a system for data cleansing is disclosed. The system includes at least one processor and a memory. The memory stores instructions that, when executed by the at least one processor, causes the at least one processor to perform operations including, receiving by a data classifier, a data corpus comprising one or more words. The instructions further include grouping the one or more words into a plurality of pre-defined categories and determining an overlap ratio between each pair of the plurality of pre-defined categories based on a comparison between each of the plurality of pre-defined categories. The instructions further include computing a normalized overlap ratio for each of the plurality of pre-defined categories based on a combination of each overlap ratio. At least one of the plurality of pre-defined categories is determined based on a comparison between each of the normalized overlap ratio and an ideal overlap ratio. Finally, the instructions include removing one or more common words from the selected at least one of the plurality of pre-defined categories based on a frequency of occurrence of the one or more common words.

In another embodiment, a non-transitory computer-readable storage medium for assistive photography is disclosed, which when executed by a computing device, cause the computing device to perform operations including, receiving by a data classifier, a data corpus comprising one or more words. The operations further include grouping the one or more words into a plurality of pre-defined categories and determining an overlap ratio between each pair of the plurality of pre-defined categories based on a comparison between each of the plurality of pre-defined categories. The operations further include computing a normalized overlap ratio for each of the plurality of pre-defined categories based on a combination of each overlap ratio. At least one of the plurality of pre-defined categories is determined based on a comparison between each of the normalized overlap ratio and an ideal overlap ratio. Finally, the operations include removing one or more common words from the selected at least one of the plurality of pre-defined categories based on a frequency of occurrence of the one or more common words.

BRIEF DESCRIPTION OF THE DRAWINGS

The accompanying drawings, which are incorporated in and constitute a part of this disclosure, illustrate exemplary embodiments, and together with the description, serves to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide a system and method of data cleansing for improved data classification. The present subject matter obtains one or more words, where the one or more words may be in the form of a phrase, sentence or a paragraph. Subsequently, the one or more words may be grouped into a plurality of pre-defined categories. An overlap ratio may be determined between each pair of the plurality of pre-defined categories based on a comparison between each of the plurality of pre-defined categories. The comparison may be based upon the bag of words intersection process. Upon determining the overlap ratio, a normalized overlap ratio may be computed for each pre-defined category based on a combination of each overlap ratio. An ideal overlap ratio may be computed based on one or more distinct categories associated with each of the plurality of pre-defined categories. The one or more distinct categories include null or no common words between them. At least one of the plurality of pre-defined categories may be selected based on a comparison between each of the normalized overlap ratio and the ideal overlap ratio. Finally, one or more words may be removed from the at least one of the plurality of pre-defined categories based on the frequency of occurrence of the one or more words in the plurality of the pre-defined categories.

Figure 1:
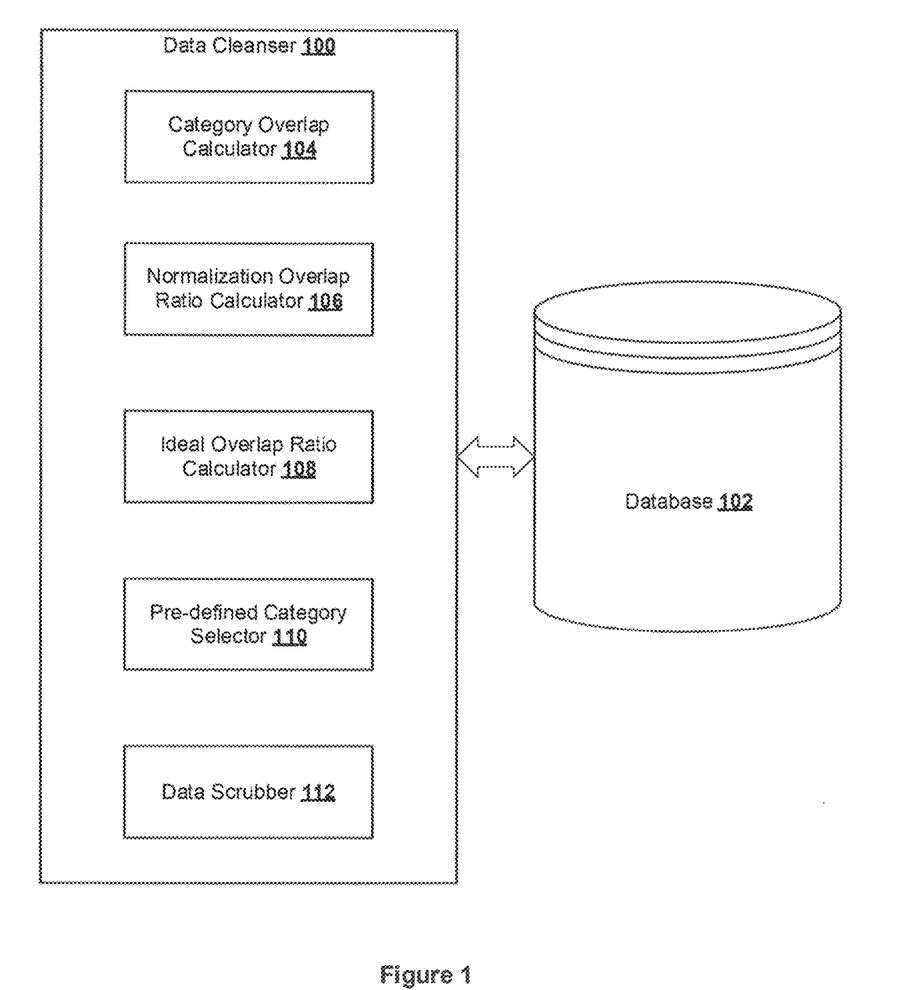
FIG. 1 illustrates a data cleanser in accordance with some embodiments of the present disclosure.

FIG. 1 illustrates a data cleanser 100 in accordance with some embodiments of the present disclosure. The data cleanser 100 may be communicatively coupled with a database 102. The data cleanser 100 comprises a category overlap calculator (COC) 104, a normalized overlap ratio calculator (NORC) 106, an ideal overlap calculator (IOC) 108, a pre-defined category selector (PCS) 110, and a data scrubber 112.

Further, the data classifier 100 may communicate with the database 102, through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc. In some embodiments, the database 102 may be a local database present within the data classifier 100.

As shown in FIG. 1, the database 102 may include one or more pre-defined category. In an example, the pre-defined categories may be related to finance, such as banking, security, insurance or related to ticketing system such as printer issues, network issues etc.

In some embodiments, the database 102, may store one or more words grouped under each of the pre-defined categories. In an example, the words payment, EMI, risk, principal, review etc may be grouped under the different pre-classified categories. The bag of words model may be used to group the one or more words into the pre-defined categories.

The data cleanser 100 may be implemented on a variety of computing systems. Examples of the computing systems may include a laptop computer, a desktop computer, a tablet, a notebook, a workstation, a mainframe computer, a smart phone, a server, a network server, and the like. Although the description herein is with reference to certain computing systems, the systems and methods may be implemented in other computing systems, albeit with a few variations, as will be understood by a person skilled in the art.

In operations, to cleanse data, the COC 104 may receive one or more words, which may be interchangeably referred to as the problem statement. In some embodiments, the one or more words may be a phrase, a sentence, a paragraph, or a document. In some embodiments, the COC 104 may use the bag of words model to break down the problem statement into its constituent words and group the constituent words into the pre-defined categories. In the bag of words model, the problem statement may be represented as the bag of its words, disregarding grammar and even word order but keeping multiplicity. The frequency of occurrence of each word is used as a feature for training a classifier for data classification. In an example, at least one or more problem statement may be input in the COC 104 and the words may be grouped into the pre-defined categories. In some other embodiments, the conjunctions, articles and prepositions may be removed from the bag of words created by the COC 104. In some other embodiments, some prepositions or conjunctions may be retained in the bag of words to find a causal link between the words, to assist in data classification. The one or more words grouped into the pre-defined categories may be stored in the database 102.

After grouping the one or more words into the pre-defined categories, the COC 104, may determine an overlap ratio between each pair of the plurality of pre-defined categories based on a comparison between each of the plurality of pre-defined categories. In some embodiments, the overlap ratio may be based on one or more words common between the pair of pre-defined categories.

In some embodiments, the bag of words intersection technique may be used by COC 104, to determine the overlap ratio. In the bag of words intersection technique, only the common words between two categories may be determined and retained along with their frequency in each pre-defined category. In some other embodiments, the bag of words intersection may retain the words common within two categories under comparison. However, the frequency of the common words may also be retained. In an example, the word "payment" may exist thrice in category C1 and twice in category C2. In this case, since the frequency of the word "payment" is 3 in C1, and 2 in C2, hence the word "payment" may be retained twice in the bag of words intersection set. Table 1, illustrates the pre-defined categories comprising one or more words. In Table 1, the categories are C1, C2 and C3.

TABLE 1

| Category (C1) | Category (C2) | Category (C3) |
|---|---|---|
| Payment | Payment | EMI |
| Payment | EMI | Principal |
| Payment | EMI | Principal |
| EMI | EMI | Principal |
| Principal | Principal | Interest |
| Payday | Principal | Processing |
| Savings | Payday | Savings |
| Loan | Interest | Savings |
|  | Payment | Loan |

In some embodiments, the overlap ratio of a pre-defined category say C1, may be a ratio between the words common between C1, and another pre-defined category under comparison say C2 along with their common frequencies and the total number of words in that pre-defined category or C1. In an example, referring to Table 1, the bag of words intersection between C1 and C2, that is C1∩C2 is (Payment, Payment, EMI, Principal, Payday). This is because, payment is common between C1 and C2 and the common frequency of payment is 2 between the two categories. Similarly, EMI, Principal and Payday are common between C1 and C2 and their common frequency is 1 between the categories under comparison. Hence the overlap ratio of C1 with C2 is 5/8. Table 2 illustrates each of the overlap ratio between pre-defined categories C1, C2 and C3 based on Table 1:

TABLE 2

|    | C1  | C2  | C3  |
|----|-----|-----|-----|
| C1 | 1   | 5/8 | 1/2 |
| C2 | 5/9 | 1   | 4/9 |
| C3 | 4/9 | 4/9 | 1   |

The NORC 106 may receive each of the overlap ratios from the COC 104. Upon receiving, the NORC 106 may compute a normalized overlap ratio for each of the plurality of pre-defined categories based on a combination of each overlap ratio between each pair of the plurality of pre-defined categories. In some embodiments, a total overlap ratio for a particular pre-defined category with respect to the other pre-defined categories may be calculated by summing up each of the overlap ratio associated with the particular pre-defined category with respect to the other pre-defined categories including itself by the NORC 106. In an example, referring to Table 2, the overall overlap ratio for C1 with respect to C1, C2 and C3 may be 17/8. Similarly, the overall overlap ratio of C2 with respect to C1, C2 and C3 is 18/9 and the overall overlap ratio of C3 with respect to C1, C2 and C3 is 17/9.

Upon calculating the overall overlap ratio for each pre-defined category, the NORC 106 may compute the normalized overlap ratio for each of the pre-defined categories by summing up the overall ratios and dividing each overall overlap ratio by the summation. In an example, the summation of the overlap ratios for C1, C2 and C3 is 6.014. Hence the normalized overlap ratio for C1 is 0.3533. Table 3, illustrates overall overlap ratio and normalized overlap ratio for each of the pre-defined categories.

TABLE 3

| Categories | C1  | C2  | C3  | Overall Overlap Ratio | Normalized Overlap Ratio |
|------------|-----|-----|-----|-----------------------|--------------------------|
| C1         | 1   | 5/8 | 1/2 | 17/8                  | 0.3533                   |
| C2         | 5/9 | 1   | 4/9 | 18/9                  | 0.3325                   |
| C3         | 4/9 | 4/9 | 1   | 17/9                  | 0.3141                   |

In some embodiments, the normalized overlap ratio may indicate the extent of overlap of the pre-defined categories. In an example, NORC 106, may calculate the normalized overlap ratio for category C1, with respect to categories C2 and C3 and the value may be 0.3533 as per Table 3. This may indicate quantitatively, how much pre-defined category C1 has an overlap with other two pre-defined categories C2 and C3. This may imply that there is an overlap or common words between the categories and hence a data classifier may not be able to classify the one or more words properly.

In some embodiments, an ideal overlap ratio may be determined by the IOC 108 for each of the pre-defined categories. In some embodiments, the ideal overlap ratio may be calculated by the IOC 108 based on a comparison between each pair of one or more predefined categories associated with each of the plurality of pre-defined categories, wherein each of the one or more categories are distinct comprising a plurality of distinct words. In an example, the one or more categories may be C1, where C1 comprises one or more words with their respective frequencies, yet the one or more words in C1 will be distinct from that of C2 and C3. Similarly, the one or more words in C2 may be distinct from the one or more words in C1 and C3 and the one or more words present in C3 may be distinct from the words in C1 and C2. For such distinct categories, the overlap ratio maybe C1∩C1, C2∩C2 and C3∩C3 and all will be 1, since all the words of a category must reflect in itself. Similar to the NORC 106, the IOC 108 may calculate the overall overlap ratio for each of the one or more categories based on a summation of the overlap ratios for each of the one or more categories. Hence the total overlap ratio for C1, C2 and C3 is 1, 1 and 1 respectively. In some embodiments, the IOC 108 may find the normalized overlap ratio for each of the one or more distinct categories by summing up the overall overlap ratios and dividing each overall overlap ratio by the summation. In an example, the summation of the overall overlap ratios for each of the one or more distinct categories C1, C2 and C3 may be 1+1+1=3. Following the summation, the IOC 108 may compute the normalized ratio for each of the each of the one or more distinct categories C1, C2 and C3 as 1/3, 1/3 and 1/3 respectively. The normalized ratio for each of the each of the one or more distinct categories C1, C2 and C3 may be referred to as the ideal overlap ratio. The ideal overlap ratio may signify that there are no overlaps between the categories under comparison or consideration.

In some embodiments, the one or more pre-defined categories may be given a null confusion value. A null confusion value may signify that there is no confusion among the categories under comparison, since the categories under consideration include distinct words from each other. Table 4 illustrates the one or more pre-defined categories, being C1, C2 and C3, which are distinct, comprising no overlapping words:

TABLE 4

| C1      | C2        | C3         |
|---------|-----------|------------|
| Payment | Interest  | Processing |
| EMI     | Principal | Savings    |
| Review  | Payday    | Loan       |
| Claim   | Penalty   | Bonus      |

The PCS 110, may receive the normalized overlap ratio for each of the one or more pre-defined categories and the ideal overlap ratio. In some embodiments, the PCS 110 may select at least one of the plurality of pre-defined categories based on a comparison between the normalized overlap ratio associated with each of the plurality of pre-defined categories and the ideal overlap ratio. In some embodiments, a cost function may be computed by the PCS 110, based on a difference between the normalized overlap ratio for each of the plurality of pre-defined categories and the ideal overlap ratio.

Table 5 illustrates the cost function for each of the plurality of the pre-defined categories:

TABLE 5

| Category Overlap | Ideal Overlap Ratio ($X_i$) | Normalized Overlap Ratio ($X_n$) | Cost Function = Difference ($X_i - X_n$) |
|------------------|-----------------------------|----------------------------------|------------------------------------------|
| C1 with (C2, C3) | 0.33                        | 0.3533                           | 0.0233                                   |
| C2 with (C3, C1) | 0.33                        | 0.3325                           | 0.0025                                   |
| C3 with (C1, C2) | 0.33                        | 0.3141                           | 0.0159                                   |

The column Category Overlap in Table 5 represents the category overlap of one pre-defined category with respect to the other categories. The category overlap of C1 with C2 and C3 represented by C1 with (C2, C3) signifies an overlap or confusion between the categories C1, C2 and C3, or commonality between C1 with respect to C2 and C3. The commonality may be represented in a quantified manner by giving a value to it, represented in column Cost Function (Xi–Xn) in Table 5. The cost function signifies the deviation of the predefined category C1 from the ideal value of 0.33.

In some embodiments, the PCS 110 may select the at least one of the plurality of pre-defined categories based on the highest value of the differences between the overlap ratios and the ideal overlap value. In an example, with reference to Table 5, category C1 has the highest value for the cost function, and hence C1 will be selected by the PCS 110.

In another embodiment, a confusion threshold may be determined by an expert or a user, and the PCS 110 may select all the categories from the plurality of pre-defined categories which have confusion values greater than the confusion threshold. The confusion value may be the same as the cost function for the at least one category. In an example, referring to Table 5, the confusion threshold may be set at 0.0025. Thus, the categories C1 and C3 have confusion values above 0.0025 and hence the PCS 110 will select the categories C1 and C3. The selection of the categories may be done for removal of the common words from these categories, to reduce confusion between the categories for better classification.

The selected categories may be received by the data scrubber 112. The data scrubber 112, may remove one or more common words from the selected at least one of the plurality of pre-defined categories based on a frequency of occurrence of the one or more common words. In some embodiments, the scrubber 112, may remove the common words from the category having the lower frequency of occurrence, when the category is compared to another category having the same word. When the frequency of occurrence of the common word in the selected category is greater than the frequency of occurrence of the word in the category with which the selected category is being compared, then the common word is not removed. In an example, referring to Table 1, and Table 5, the data scrubber 112 may select the category C1, from which common words are to be removed. The data scrubber 112 may compare the categories C1 and C2. To find the common words. The word "payment" occurs thrice in C1 and twice in C2. Hence the data scrubber 112 may not remove the word "payment" from C1. However, the word "EMI" occurs once in C1 and twice in C2, and hence the data scrubber 112 may remove the word "EMI" from C1. The data scrubber 112 in this way may compare the selected at least one category with all the other pre-defined categories and remove common words based on the frequency of occurrence.

In some other embodiments, the data scrubber 112 may remove the common words from the category which has the lower frequency when compared with the selected category, and retain the words in the category where the frequency of occurrence of the word has higher frequency. In an example, referring back to Table 1 and Table 5, when the data scrubber 112 may compare category C1 and category C2, then the word "payment" may not be removed from C1, but removed from C2, since the word "payment" has higher frequency of occurrence in C1, that is 3. Again, the word "EMI" may be removed by the data scrubber 112 from the category C1 and not removed from category C2, since EMI has lower frequency of occurrence in C1 compared to C2. In this way, the data scrubber, may compare the selected categories with each of the other categories and remove or retain common words based on the frequency of occurrence of the words.

In some embodiments, the PCS 110, may display a quantified value of the overall confusion based on the comparison between the each of the normalized overlap value and the ideal overlap value. In an example, the PCS 110 may determine the cost function values for each of the categories based on the comparison, and calculate the square root of the sum of the cost functions. The overall confusion provides a quantified value of a total confusion present in the three categories taken together. The overall confusion may be a system level confusion. The system level confusion alerts the user or an expert that the data classification may not be accurate because of the presence of confusion among the categories. Equation 1, provides the formula for system level confusion:

$$\text{System Level Confusion} = \text{SQRT}(\Sigma(Xi-Xn)) \quad \text{Equation 1}$$

Where Xi–Xn denotes the cost function.

Referring to Table 5, System Level Confusion=0.20420

Figure 2:
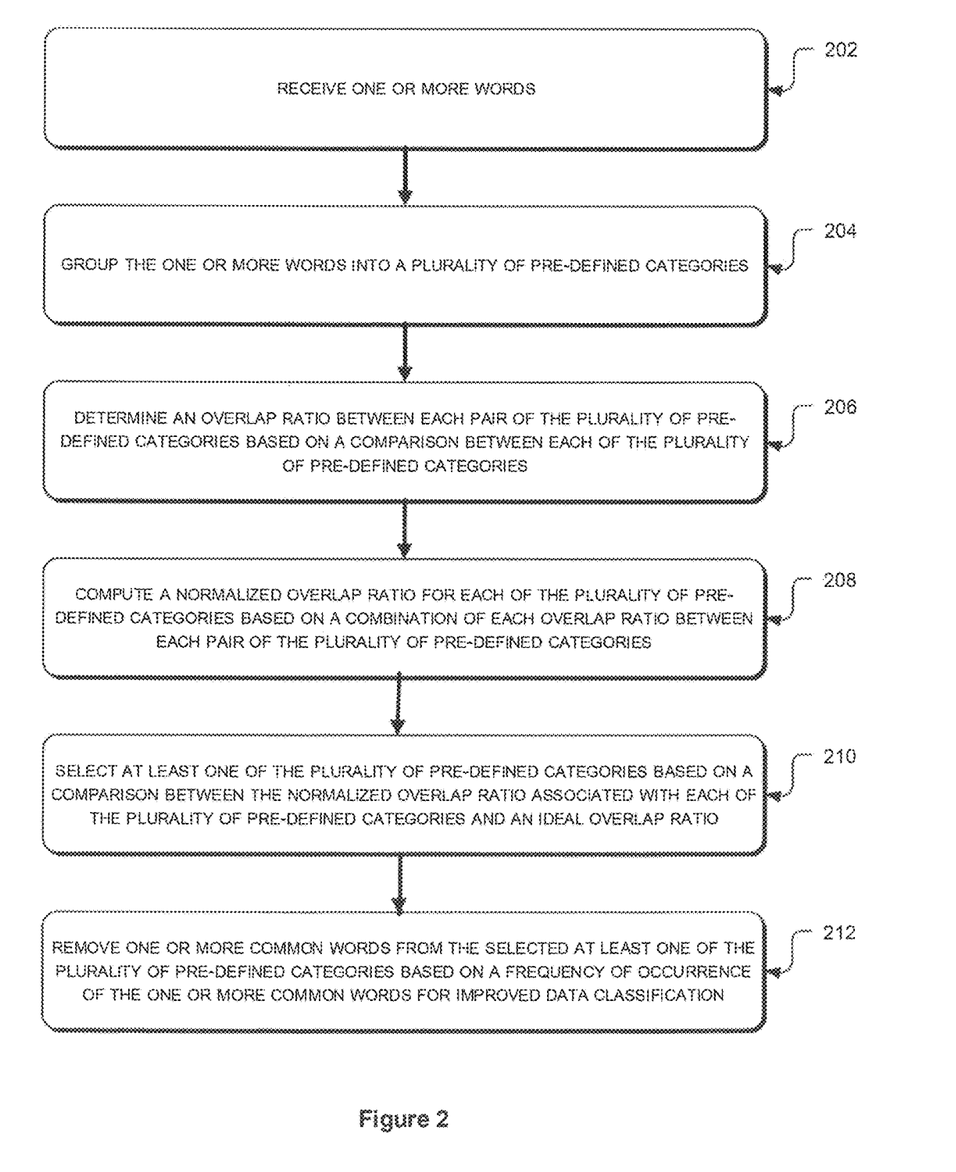
FIG. 2 illustrates an exemplary method for data cleansing in accordance with some embodiments of the present disclosure.

FIG. 2 illustrates an exemplary method for data cleansing in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

Reference is made to FIG. 2, the order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to FIG. 2, at step 202, one or more words may be received. In an example, the one or more words, may be a sentence, a paragraph or an entire document. In an example, "Printer not working due to empty ink cartridge" may be the one or more words. The one or more words may be referred to as the problem statement which may be received by the COC 104.

In some embodiments, bag of words model may be used to break the problem statement received into constituent words, without taking into account the sequence of the words appearing in the sentence. The constituent words from the sentence may be referred to as the bag of words.

At step 204, the one or more words may be grouped into a plurality of pre-defined categories. In some embodiments, the COC 104 may group the one or more words into pre-defined categories. In an example, the pre-defined categories may be insurance, banking, finance etc. In an example, the one or more words belonging to the pre-defined categories may be payment, EMI, payday etc.

After grouping the one or more words into the pre-defined categories by the COC 104, at step 206, an overlap ratio between each pair of the plurality of pre-defined categories based on a comparison between each of the plurality of pre-defined categories. In some embodiments, the bag of words intersection technique may be used to calculate each overlap ratio between a pair of categories by the COC 104. In an example, the bag of words intersection retains only the words common among the predefined categories under comparison along with their frequencies. In another example, if the word "payment" appears thrice in a pre-defined category C1 and twice in a pre-defined category C2, then the bag of words intersection technique may retain the common word "payment" twice the word in C1 can be mapped twice with word in C2.

In some embodiments, the overlap ratio of a pre-defined category say C1, may be a ratio between the words common between C1, and another pre-defined category under comparison say C2 along with their common frequencies and the total number of words in that pre-defined category or C1.

Upon receiving each overlap ratio for each of the plurality of pre-defined categories, at step 208, a normalized overlap ratio may be computed for each of the plurality of pre-defined categories based on a combination of each overlap ratio between each pair of the plurality of pre-defined categories. In some embodiments, the NORC 106 may calculate an overall overlap ratio for each of the pre-defined categories by summing up the overlap categories for each with if the plurality of the pre-defined categories with respect to the other pre-defined categories. Further the NORC 106 may add up the overall overlap ratios and divide each overall overlap ratio by the summation in order to compute the normalized overlap ratio for each pre-defined category with respect to the other pre-determined categories.

After determining the normalized overlap ratio by the NORC 106 for each pre-determined category, at step 210, at least one of the plurality of pre-defined categories may be selected, based on a comparison between the normalized overlap ratio associated with each of the plurality of pre-defined categories and an ideal overlap ratio. In some embodiments, the ideal overlap ratio may be computed by the IOC 108, by comparing one or more pre-defined categories associated with the plurality of pre-defined categories. In an example, the one or more pre-defined categories may comprise words, which may be distinct and there may be no commonality between the one or more categories. Hence in an example, if the one or more pre-defined categories may be C1, C2 and C3, then the overlap ratio of each of the one or more pre-defined categories may be 1, and the normalized overlap ratio of each of the one or more pre-defined categories may be 0.33. The normalized ratio of each of the one or more pre-defined categories may be referred to as the ideal overlap ratio.

In another example, the one or more pre-defined categories may have a null confusion value, that is there is no commonality with respect to words between them. Hence a classifier may be able to classify the one or more pre-defined categories without any confusion.

In some other embodiments, the PCS 110 may receive each of the normalized overlap ratios of each of the plurality of pre-defined categories and the ideal overlap ratio. The PCS 110 may then determine a cost function for each of the pre-defined categories, based on a comparison between the pre-defined category relative to the other pre-defined categories. In an example, the cost function for the each of the plurality of pre-defined categories may be the difference between the normalized overlap ratio for the particular pre-defined category and the ideal overlap ratio. The cost function value may signify the amount of deviation or confusion that may exist between the categories. The cost function of a pre-defined category C1, with respect to a pre-defined category C2 and a pre-defined category C3 may indicate the amount of commonality of C1 with respect to C2 and C3.

In some embodiments, the user may define a confusion threshold. The confusion threshold may be any number, and if the confusion value of a pre-defined category is above the confusion threshold, then the PSC 110 ay select the at least one pre-defined category. A confusion value of a pre-defined category may be the commonality of the pre-defined category relative to the other pre-defined categories. In some embodiments, the confusion value may be the same as the cost function value for the pre-defined category.

At step 212, one or more common words may be removed from the selected at least one of the plurality of pre-defined categories based on a frequency of occurrence of the one or more common words for improved data classification. In some embodiments, the data scrubber 114, may remove one or more words from the selected pre-defined category based on the frequency of occurrence of the one or more common words between the selected pre-defined category and each of the rest of the plurality of the pre-defined categories.

In some embodiments, if the frequency of occurrence of a word is greater in the selected pre-defined category compared to a pre-defined category, then the word may not be removed from the selected pre-defined category. However, if the word has frequency of occurrence lower in the selected pre-defined category, relative to the other pre-defined category, under comparison, then the word may be removed from the selected pre-defined category. In this way, the data scrubber 112 may compare each of the selected pre-defined category with each of the plurality of pre-defined categories.

In some other embodiments, the one or more common words may be removed from the selected pre-defined category, if the frequency of occurrence of the word in the selected pre-defined category is lesser than the frequency of occurrence of the word in the pre-defined category with which the selected pre-defined category is being compared. However, the word may be retained in the pre-defined category with which the selected pre-defined category is being compared. Similarly, if the frequency of occurrence of the word is greater in the selected pre-defined category, then the word may be retained in the selected pre-defined category and removed from the pre-defined category with which the selected pre-defined category is being compared. In an example, if the word "payment" appears thrice in selected pre-defined category C1, and twice in the pre-defined category C2, with which the selected pre-defined category C1 is being compared, then "payment" may be removed from the pre-defined category C2, and retained in the selected pre-defined category C1 by the data scrubber 112. In this way, the plurality of pre-determined categories may be scrubbed for data cleansing which may lead to improved data classification.

In some other embodiments, an overall confusion may be displayed among the plurality of pre-defined categories, based on a combination of the comparison between each of the normalized overlap ratio for each pre-defined category with the ideal overlap ratio. The overall confusion may be a system level confusion denoting quantitatively the amount of confusion present in the plurality of pre-defined categories under consideration. In some embodiments, the PCS 110 may calculate and display the overall confusion. In some embodiments, the overall confusion may be the square root of the addition of the cost functions of each of the pre-defined categories.

The advantages of the present invention may be the ability to provide an accurate objective assessment of the amount of coupling or commonality or confusion among the various pre-defined categories. The identification of the categories objectively for removal of common words may also lead to better data cleansing and result in more efficient data classification.

Computer System

Figure 3:
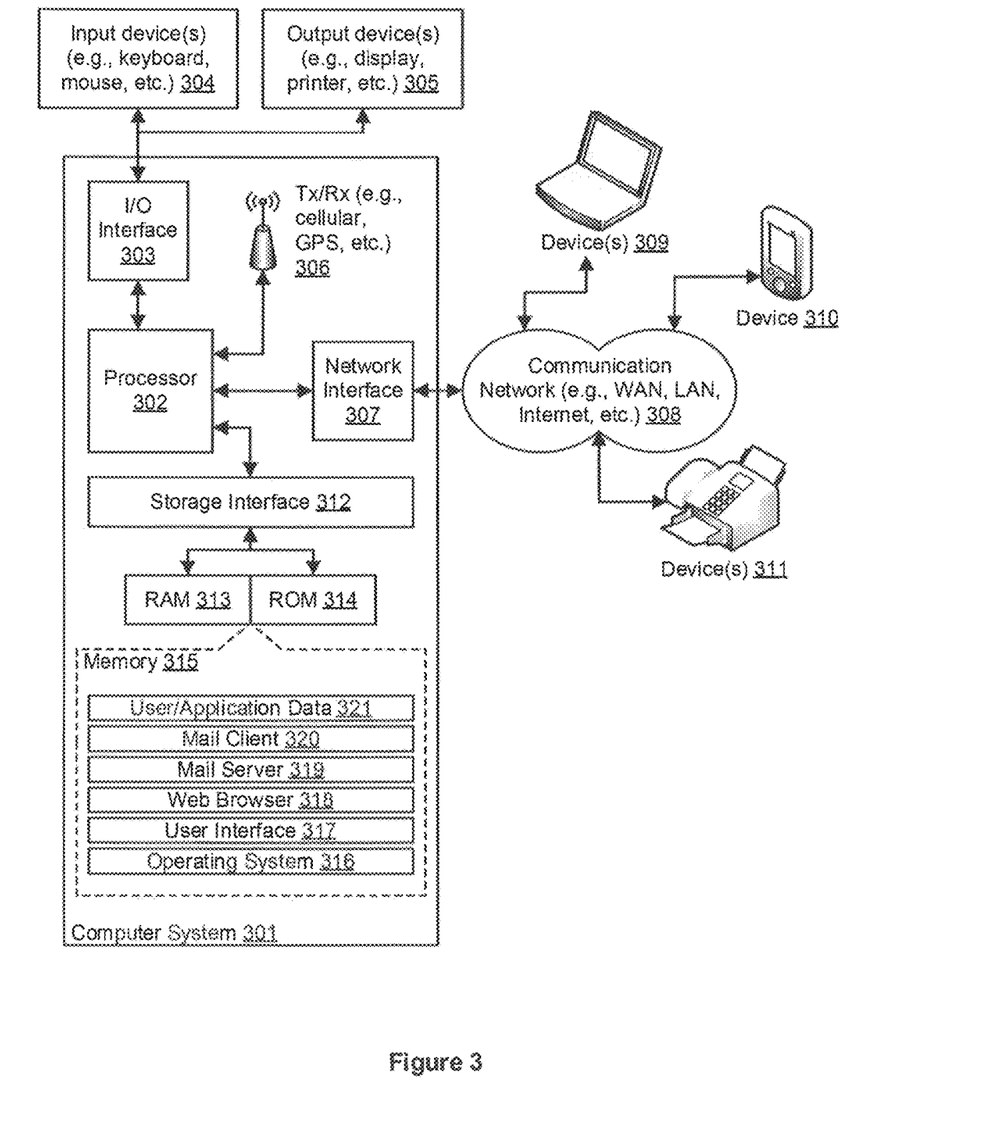
FIG. 3 is a block diagram of an exemplary computer system for implementing embodiments consistent with the present disclosure.

FIG. 3 is a block diagram of an exemplary computer system for implementing embodiments consistent with the present disclosure. Variations of computer system 301 may be used for implementing the devices and systems disclosed herein. Computer system 301 may comprise a central processing unit ("CPU" or "processor") 302. Processor 302 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 316, user interface application 317, web browser 318, mail server 316, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 821, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described a system and method for data cleansing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method of data cleansing for improved data classification, the method comprising:
    receiving, by a data cleanser, one or more words;
    grouping, by the data cleanser, the one or more words into a plurality of pre-defined categories;
    determining, by the data cleanser, an overlap ratio between each pair of the plurality of pre-defined categories based on a comparison between each of the plurality of pre-defined categories, wherein the overlap ratio is a ratio between words common between each pair of the plurality of pre-defined categories along with common frequencies and a total number of words in corresponding pre-defined category;
    computing, by the data cleanser, a normalized overlap ratio for each of the plurality of pre-defined categories based on a combination of each overlap ratio between each pair of the plurality of pre-defined categories, wherein the normalized overlap ratio for each of the plurality of pre-defined categories is computed by summation of overall overlap ratios and dividing each overall overlap ratio by the summation;
    selecting, by the data cleanser, at least one of the plurality of pre-defined categories based on a comparison between the normalized overlap ratio associated with each of the plurality of pre-defined categories and an ideal overlap ratio, wherein selecting the at least one category comprises identifying the at least one category with a confusion value greater than a confusion threshold, wherein the confusion value is calculated based on comparing each of the normalized overlap ratio for each pre-defined category with the ideal overlap ratio; and
    removing, by the data cleanser, one or more common words from the selected at least one of the plurality of pre-defined categories based on a frequency of occurrence of the one or more common words for improved data classification.

2. The method of claim 1, wherein the ideal overlap ratio is computed based on a comparison between each pair of one or more predefined categories associated with each of the plurality of pre-defined categories, wherein each of the one or more categories are distinct, comprising a plurality of distinct words.

3. The method of claim 2, wherein each of the one or more predefined categories comprise a null confusion value, denoting zero confusion between each of the one or more pre-defined categories.

4. The method of claim 1, wherein the frequency of occurrence of the one or more common words is based on the comparison between each pair of the plurality of pre-defined categories.

5. The method of claim 1 further comprises displaying an overall confusion among the plurality of pre-defined categories, based on a combination of the comparison between each of the normalized overlap ratio for each pre-defined category with the ideal overlap ratio.

6. A system for data classification, comprising:
a hardware processor;
a display;
a memory storing instructions executable by the hardware processor for:
receiving one or more words;
grouping the one or more words into a plurality of pre-defined categories;
determining an overlap ratio between each pair of the plurality of pre-defined categories based on a comparison between each of the plurality of pre-defined categories, wherein the overlap ratio is a ratio between words common between each pair of the plurality of pre-defined categories along with common frequencies and a total number of words in corresponding pre-defined category;
computing a normalized overlap ratio for each of the plurality of pre-defined categories based on a combination of each overlap ratio between each pair of the plurality of pre-defined categories, wherein the normalized overlap ratio for each of the plurality of pre-defined categories is computed by summation of overall overlap ratios and dividing each overall overlap ratio by the summation;
selecting at least one of the plurality of pre-defined categories based on a comparison between the normalized overlap ratio associated with each of the plurality of pre-defined categories and an ideal overlap ratio, wherein selecting the at least one category comprises identifying the at least one category with a confusion value greater than a confusion threshold, wherein the confusion value is calculated based on comparing each of the normalized overlap ratio for each pre-defined category with the ideal overlap ratio; and
removing one or more common words from the selected at least one of the plurality of pre-defined categories based on a frequency of occurrence of the one or more common words for improved data classification.

7. The system of claim 6, wherein the ideal overlap ratio is computed based on a comparison between each pair of one or more predefined categories associated with each of the plurality of pre-defined categories, wherein each of the one or more categories are distinct comprising a plurality of distinct words.

8. The system of claim 7, wherein each of the one or more predefined categories comprise a null confusion value, denoting zero confusion between each of the one or more pre-defined categories.

9. The system of claim 6, wherein the frequency of occurrence of the one or more common words is based on the comparison between each pair of the plurality of pre-defined categories.

10. The system of claim 6, further comprises displaying an overall confusion among the plurality of pre-defined categories, based on a combination of the comparison between each of the normalized overlap ratio for each pre-defined category with the ideal overlap ratio.

11. A non-transitory computer-readable medium storing instructions for data cleansing for improved data classification, wherein upon execution of the instructions by one or more processors, the processors perform operations comprising:
receiving one or more words;
grouping the one or more words into a plurality of pre-defined categories;
determining an overlap ratio between each pair of the plurality of pre-defined categories based on a comparison between each of the plurality of pre-defined categories, wherein the overlap ratio is a ratio between words common between each pair of the plurality of pre-defined categories along with common frequencies and a total number of words in corresponding pre-defined category;
computing a normalized overlap ratio for each of the plurality of pre-defined categories based on a combination of each overlap ratio between each pair of the plurality of pre-defined categories, wherein the normalized overlap ratio for each of the plurality of pre-defined categories is computed by summation of overall overlap ratios and dividing each overall overlap ratio by the summation;
selecting at least one of the plurality of pre-defined categories based on a comparison between the normalized overlap ratio associated with each of the plurality of pre-defined categories and an ideal overlap ratio, wherein selecting the at least one category comprises identifying the at least one category with a confusion value greater than a confusion threshold, wherein the confusion value is calculated based on comparing each of the normalized overlap ratio for each pre-defined category with the ideal overlap ratio; and
removing one or more common words from the selected at least one of the plurality of pre-defined categories based on a frequency of occurrence of the one or more common words for improved data classification.

12. The medium as claimed in claim 11, wherein the ideal overlap ratio is computed based on a comparison between each pair of one or more predefined categories associated with each of the plurality of pre-defined categories, wherein each of the one or more categories are distinct comprising a plurality of distinct words.

13. The medium as claimed in claim 12, wherein each of the one or more predefined categories comprise a null confusion value, denoting zero confusion between each of the one or more pre-defined categories.

14. The medium as claimed in claim 11, wherein the frequency of occurrence of the one or more common words is based on the comparison between each pair of the plurality of pre-defined categories.

15. The medium as claimed in claim 11, further comprises displaying an overall confusion among the plurality of pre-defined categories, based on a combination of the comparison between each of the normalized overlap ratio for each pre-defined category with the ideal overlap ratio.

* * * * *